United States Patent
Garrett et al.

(10) Patent No.: US 8,090,412 B2
(45) Date of Patent: Jan. 3, 2012

(54) MULTI-SECTOR BASE STATION AND SHARED PROCESSING INFORMATION

(75) Inventors: David Garrett, Santa Clara, CA (US);
Trevor Pearman, Santa Clara, CA (US);
Brett Schein, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 743 days.

(21) Appl. No.: 11/488,221

(22) Filed: Jul. 17, 2006

(65) Prior Publication Data

US 2007/0015544 A1  Jan. 18, 2007

Related U.S. Application Data

(60) Provisional application No. 60/700,360, filed on Jul. 17, 2005.

(51) Int. Cl.
*H04M 1/00* (2006.01)
(52) U.S. Cl. .............. 455/562.1; 455/422.1; 455/452.1; 455/132; 455/133; 370/328; 370/334
(58) Field of Classification Search ............... 455/562.1, 455/422.1, 452.1, 132, 133; 370/328–329, 370/334

See application file for complete search history.

(56) References Cited

U.S. PATENT DOCUMENTS

| | | | | |
|---|---|---|---|---|
| 2003/0073464 A1* | 4/2003 | Giannakis et al. | ............ | 455/562 |
| 2005/0124347 A1* | 6/2005 | Hosein | ............ | 455/446 |
| 2005/0190800 A1* | 9/2005 | Maltsev et al. | ............ | 370/914 |
| 2006/0009208 A1* | 1/2006 | Jang et al. | ............ | 455/422.1 |
| 2006/0234777 A1* | 10/2006 | Vannithamby et al. | .... | 455/562.1 |
| 2007/0054621 A1* | 3/2007 | Larsson | ............ | 455/67.11 |
| 2008/0119197 A1* | 5/2008 | Skarby | ............ | 455/446 |

\* cited by examiner

*Primary Examiner* — Kamran Afshar
*Assistant Examiner* — Kathy Wang-Hurst
(74) *Attorney, Agent, or Firm* — Sterne, Kessler, Goldstein & Fox P.L.L.C.

(57) ABSTRACT

A communication system is described in which a receiver allocated to a sector of a communication network receives signals via all antennas of the network regardless of the sector allocation of the antenna. The system includes multiple antennas configured to form numerous antenna sets. Each antenna set is allocated to one of a number of sectors of a communication network. The system includes numerous modems or receivers, and each modem is coupled to an antenna set of a sector. The system includes a memory device coupled to the modems. The memory device includes signal processing information shared among the modems of the system. The signal processing information allows each modem to receive communications from subscriber stations in any sector via any of the system receive antennas.

27 Claims, 7 Drawing Sheets

MULTI-SECTOR BASE STATION AND SHARED PROCESSING INFORMATION

RELATED APPLICATION

This application claims the benefit of U.S. Patent Application No. 60/700,360, filed Jul. 17, 2005.

TECHNICAL FIELD

The embodiments provided herein relate to communication systems.

BACKGROUND

Wireless digital communications systems are poised to offer a cost-effective alternative to cable and Digital Subscriber Line (DSL) technologies or data services. One example of wireless digital communications systems is the Worldwide Interoperability for Microwave Access technology, or so called "WiMAX" technology. The WiMAX technology is based on the IEEE 802.16e air interface standard and is a promising framework for broadband wireless applications. WiMAX has the potential to enable full internet and digital voice services for both fixed and mobile users.

The WiMAX network architecture includes a subscriber station (SS) that communicates with a base station (BTS) via a wireless link or interface. The BTS includes PHY and media access controller (MAC) functionality, where PHY functionality takes care of encoding and decoding between a pure digital domain and a modulation in the analog domain. The BTS can be a multiple-sector BTS in which each sector is served with one or more antennas. The conventional WiMAX network architecture partitions the set of all BTS receive antennas between the different sectors. A network with twelve receive antennas, for example, supports each of three different sectors by allocating the twelve receive antennas into three sets of four receive antennas per set, with each antenna set assigned or allocated to support one sector. However, this receive antenna allocation scheme reduces the uplink (UL) capacity of the network because in operation each sector only has available to it the use of a subset of the total number of available receive antennas (e.g. each sector only has use of four receive antennas even though the BTS is coupled to twelve receive antennas in the example above). Consequently, there is a need for a wireless communication system in which the antenna allocation scheme allows all BTS antennas to be used to receive SS communications in any sector.

INCORPORATION BY REFERENCE

Each publication, patent, and/or patent application mentioned in this specification is herein incorporated by reference in its entirety to the same extent as if each individual publication, patent and/or patent application was specifically and individually indicated to be incorporated by reference.

DETAILED DESCRIPTION

Figure 1:
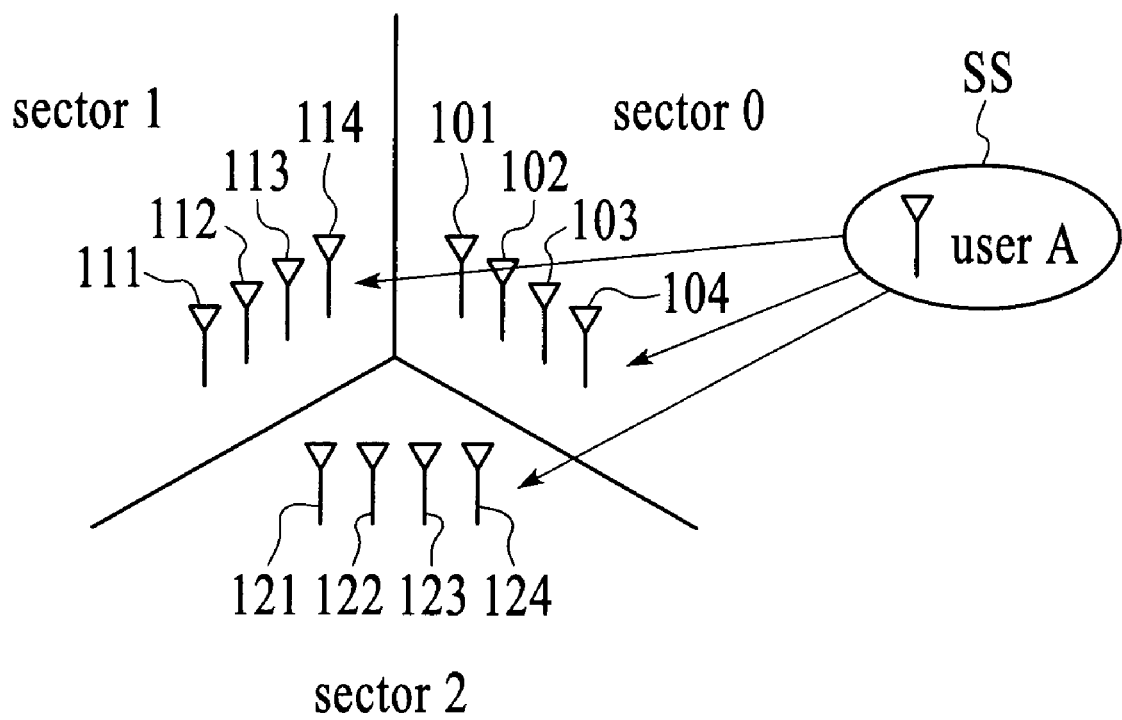
FIG. 1 is a block diagram of communication system with a multiple-sector base station (BTS) in which all receive antennas of the BTS are configured to receive transmissions from a subscriber station SS, under an embodiment.

Communication systems and methods are described herein in which a modem or receiver allocated to a sector of a communication network receives signals via all antennas of the network regardless of the sector allocation of the antenna. The communication systems and methods described herein, collectively referred to as the "communication system" or as the "multi-sector base station (BTS)," includes multiple antennas configured to form numerous antenna sets. Each antenna set is allocated to one of a number of sectors of a BTS. The system includes numerous modems or receivers, and each modem is coupled to an antenna set of a sector. The system includes a memory device coupled to the modems. The memory device includes signal processing information shared among the modems of the system. The signal processing information allows each modem to receive communications from subscriber stations in any sector via any of the system receive antennas. The "signal processing information" of an embodiment includes one or more of demodulation information, decoding information, LLR information or values, and confidence information, but is not limited to this information as it may include any information appropriate to signal processing operations of the embodiment.

The multi-sector BTS described herein provides a scalable and distributed communications system in which each sector generates its own processing information (e.g. LLR information) and shares or exchanges processing information and/or instructions for generating processing information with processing components of other sectors. The communication system of an embodiment therefore allows for a distributed "push" inter-sector communication architecture. Furthermore, generating processing information (e.g. LLR information) from a subset of antennas is computationally easier than doing so from a larger set of antennas because the computation is more modular as a result of combining information at the point of LLRs rather than raw antenna receive sample.

The multi-sector BTS described herein also provides graceful degradation of communications resulting from bandwidth limitations. The effects of any degradation are generally reduced or eliminated in an embodiment because the sharing of processing information limits the loss of information resulting from communication bandwidth limitations because the limitations typically result only in the loss of remote processing information (e.g. LLR information).

The multi-sector BTS of an embodiment is directly extensible to combining receive information from different BTSs. Furthermore, the availability of additional processing information in the BTS allows for a multi-pass FEC decoding algorithm, for example, in which a second FEC decoding attempt may be made with more processing information if a first FEC decoding attempt fails. This can reduce average decoding latency, particularly if combining information from different BTSs.

In the following description, numerous specific details are introduced to provide a thorough understanding of, and enabling description for, embodiments of the multi-sector BTS. One skilled in the relevant art, however, will recognize that the multi-sector BTS can be practiced without one or more of the specific details, or with other components, systems, etc. In other instances, well-known structures or operations are not shown, or are not described in detail, to avoid obscuring aspects of the multi-sector BTS.

FIG. 1 is a block diagram of communication system with a multiple-sector base station (BTS) 100 in which all receive antennas of the BTS 100 are configured to receive transmissions from a subscriber station SS, under an embodiment. The SS is associated with a particular sector and user (e.g. User A) but may not be so limited. The multiple-sector BTS 100 of this example includes three sectors sector 0/sector 1/sector 2 but is not so limited. In the multiple-sector BTS 100, each sector is served with one or more antennas so that communications between the BTS 100 and SS are supported in each sector with one or more BTS antennas allocated to that sector. Therefore, using the BTS of this example, antennas 101-104 are allocated or partitioned to support communications in sector 0, antennas 111-114 are allocated or partitioned to support communications in sector 1, and antennas 121-124 are allocated or partitioned to support communications in sector 2.

The coupling or connection of each sector modem provided under an embodiment supports partitioning the receive antennas between the sector modems and then passing or sharing information between sector modems to achieve improved performance, as described below. This allows, for example, one or more antennas in each of sector 0, sector 1, and/or sector 2 to be used for receiving and/or processing communications or signals from the SS even though the SS is associated with sector 0 in this example. The performance improvement includes improvement in uplink (UL) capacity through the use of all receive antennas 101-124 on the BTS 100 to receive a transmission from a particular SS, even if that SS is associated with one particular sector.

Figure 2:
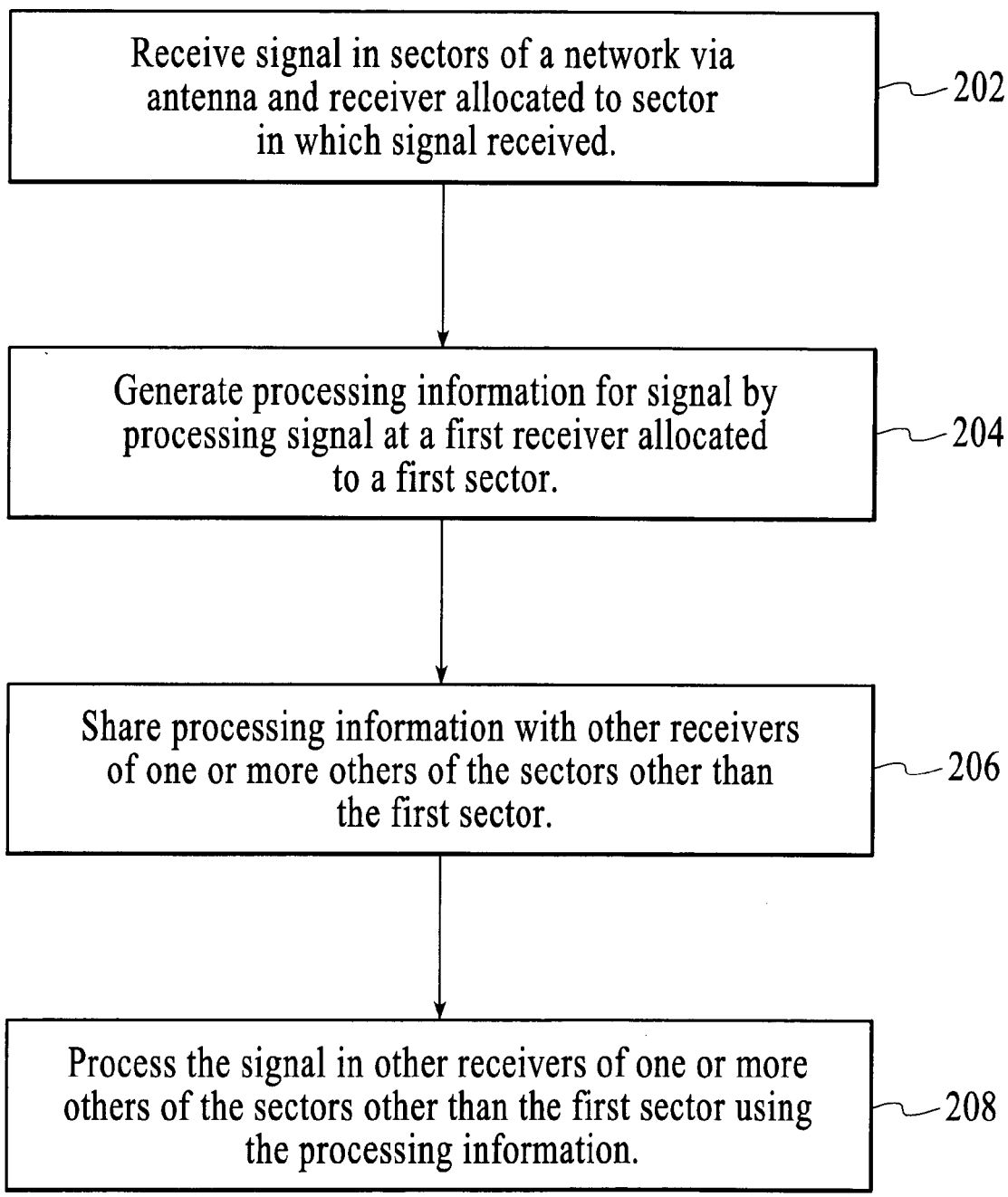
FIG. 2 is a flow diagram for communications in which a sector modem uses all antennas of a BTS to receive signals from a corresponding SS, under an embodiment.

FIG. 2 is a flow diagram for communications 200 in which a sector modem uses all antennas of a BTS to receive signals from a corresponding SS, under an embodiment. The signal from the SS is received 202 in multiple sectors of the BTS via an antenna and a modem or receiver allocated to the sector in which the signal is received. The SS however is associated with a particular one of the sectors (e.g. first sector). The communications of an embodiment generate 204 processing information for the signal by processing the signal at a first modem, where the first modem is allocated to the first sector. The processing information once generated by the first modem is shared 206 with other modems of the BTS, where the other modems are allocated to one or more other BTS sectors other than the first sector. The signal, when received in the other modems (allocated or assigned to other sectors), is processed 208 in the receiving modem using the shared processing information generated by the first modem. The communications 200 therefore allow a modem to receive and process a SS signal using an antenna of other sectors that are different from the sector (e.g. first sector) with which the SS generating the signal is associated.

More specifically, a wireless communications receiver generally processes transmissions received via a receiver chain (e.g. antenna and receiver) using processing that includes demodulation and decoding. In demodulation processing, the signal is received and demodulated using receiver samples and the channel estimate of the receiver chain. When there are multiple antennas used for reception, the receive chains associated with different antennas can be combined in multiple ways. For example, they can be coherently combined using maximal-ratio combining (MRC), which is a method of diversity combining in which the signals from each channel are added together, the gain of each channel is made proportional to the root mean square (RMS) signal level and inversely proportional to the mean square noise level in that channel, and the same proportionality constant is used for all channels. The MRC may alternatively be referred to as ratio-squared combining, pre-detection combining and selective combining. The combining of an embodiment can also include combining using a minimum mean square error (MMSE) criterion.

The result of the demodulation process can be represented by generating log-likelihood ratio (LLR) information and a confidence metric. The LLR information is a representation of the transmitted, encoded binary information, while the confidence metric is related to the accuracy of the transmitted information. The decoding processing passes or transfers the LLR information to a forward error correcting (FEC) decoder. The FEC decoder uses additional redundancy in the encoded bit stream to significantly reduce the bit error rate of the system.

In order for each sector modem of a multi-sector BTS to receive using all BTS antennas, one solution is to couple or feed all BTS antennas directly into each sector modem. In contrast, the multi-sector BTS embodiments described herein allocate or partition the receive antennas between the sector modems and share or transfer processing information between sector modems to achieve comparable performance.

Figure 3:
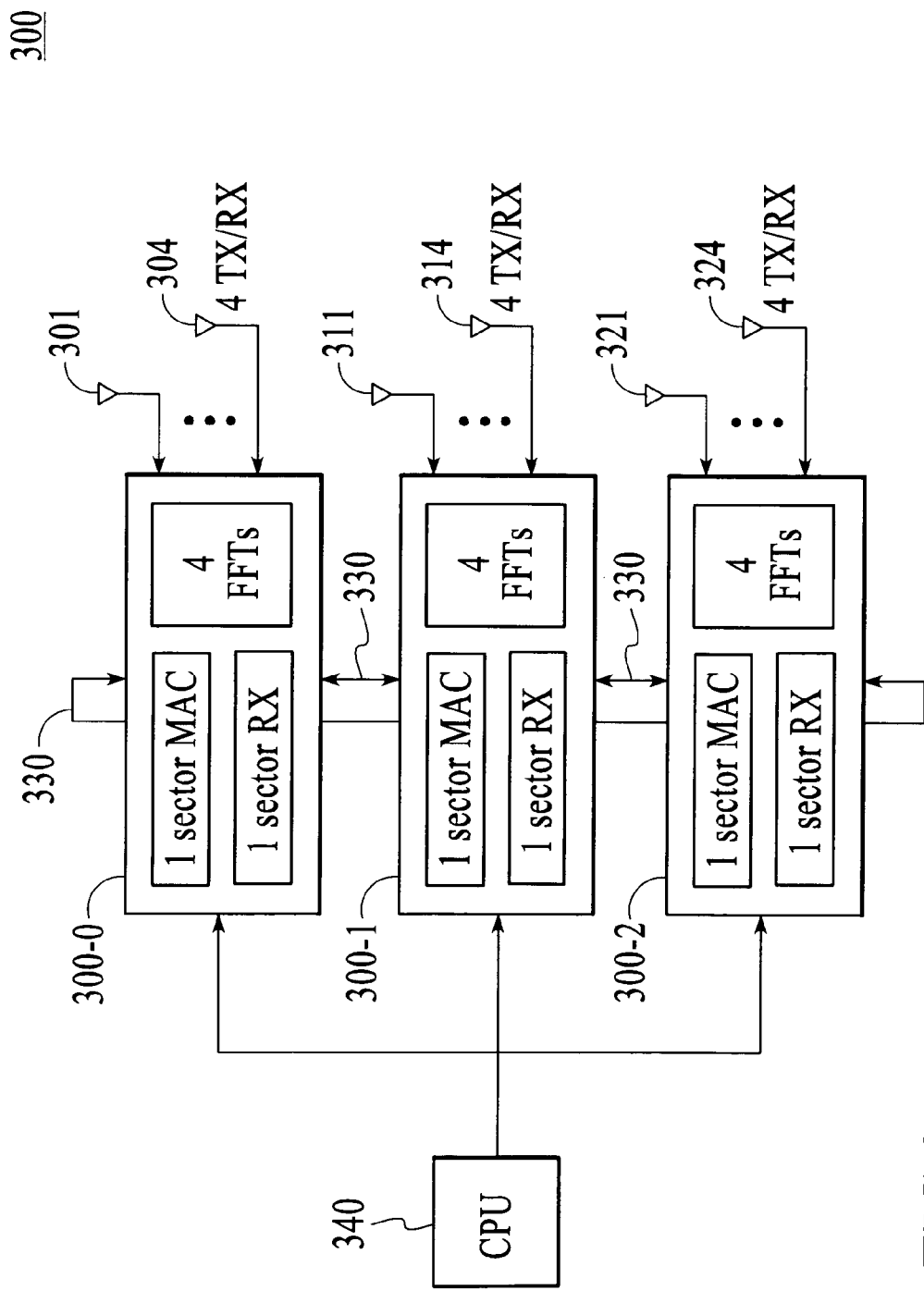
FIG. 3 is a block diagram of a multi-sector BTS with shared processing information, under an embodiment.

FIG. 3 is a block diagram of a multi-sector BTS 300 with shared processing information, under an embodiment. The multi-sector BTS 300 of this example includes three modems 300-0, 300-1, 300-2, and each modem is coupled to four antennas (e.g., modem 300-0 is coupled to antennas 301-304, modem 300-1 is coupled to antennas 311-314, and modem 300-2 is coupled to antennas 321-324); modems of alternative embodiments can couple to any number and/or type of antennas. Each modem 300-0, 300-1, 300-2 and the corresponding antennas to which the modem is coupled are allocated to each of the three sectors supported by the BTS 300. With reference to FIG. 1, for example, the first modem 300-0 and corresponding antennas 301-304 are allocated to sector 0, the second modem 300-1 and corresponding antennas 311-314 are allocated to sector 1, and the third modem 300-2 and corresponding antennas 321-324 are allocated to sector 2. The multi-sector BTS 300 comprises a bus 330 or other coupling that is coupled to each of the modems 300-0, 300-1, 300-2 of the BTS 300. Further, a central processing unit (CPU) 340 or other processor couples to each of the modems 300-0, 300-1, 300-2. Alternatively, the CPU 340 can couple to the bus 330 and/or a variety of other components of the BTS 300 as appropriate to a configuration of the BTS 300.

The modem 300-0, 300-1, 300-2 of an embodiment includes numerous components for receiving, transmitting, and/or processing communication signals appropriate to the BTS and/or the communication system or network. For example, each modem is a processor-based component that includes a media access controller (MAC), a receiver (RX), and one or more signal processing components (e.g. FFTs). In an embodiment, the signal processing components may be dedicated to specific channels of the modem (e.g. four (4) FFTs in a modem coupled to four (4) antennas, where one FFT operates on signals from one antenna) and/or may be distributed for use among multiple channels of a modem.

Figure 4:
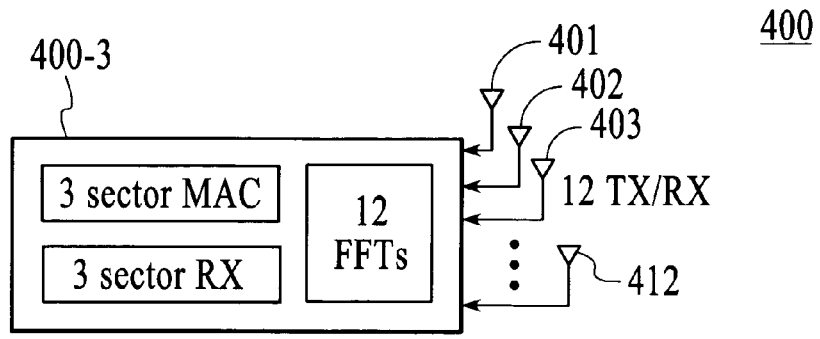
FIG. 4 is a block diagram of a multi-sector BTS, with shared processing information, which includes components of a twelve-channel receiver on a centralized chipset, under an embodiment.

The multi-sector BTS 300 is embodied as a modular chipset in which each modem is on a dedicated chip. In an alternative embodiment, the multi-sector BTS is embodied on a single chip. FIG. 4 is a block diagram of a multi-sector BTS 400 with shared processing information that includes components of a twelve-channel receiver on a centralized chipset 400-3, under an embodiment. The centralized chipset 400-3 includes all components necessary for receiving signals from twelve (12) antennas, for example, which is in contrast to dedicated chips hosting a single modem as described above with reference to FIG. 3.

Using the multi-sector BTS with shared processing information of an embodiment, each sector modem is directly coupled only to sector antenna(s) of the sector to which the sector modem and antennas are allocated or assigned, as described above. For purposes of the following description, an "original sector modem" is a modem of the BTS allocated to a particular sector at issue, while a "remote sector modem" refers to modems of the BTS allocated to other sectors of the BTS other than the original sector. A remote sector modem may also be referred to herein as a remote modem.

Each original sector modem demodulates the traffic for its allocated sector and stores the processing information. The processing information can be stored in a memory or memory device that includes, for example, a local memory of the modem and/or a shared memory of the BTS. More specifically, each original sector modem demodulates the traffic for its own sector and stores the LLR values and/or other information resulting from demodulation using only the sector antennas of the receiving sector modem. Each original sector modem also passes instructions to the remote sector modems of the BTS, where the instructions relate to processing (e.g. demodulating, etc.) signal traffic received at the remote modem using only the sector antennas of the remote modem. The remote sector modems then perform the processing (e.g. demodulation) and send the LLR information back to the original sector modem. The original sector modem then decodes the processing information by soft combining the LLR information from each sector modem and then FEC decoding the resulting user information.

The multi-sector BTS of an embodiment couples or connects each sector modem through a structure that includes a shared memory. With reference to multi-sector BTS 300 described above with reference to FIG. 3, for example, the shared memory can be a component of and/or coupled to the CPU 340, coupled to the bus 330, and/or distributed among the CPU 340 and/or other components of the host BTS. A sector modem requests demodulated LLRs for each of its associated SSs (users) from other remote sector modems, as received from the antennas of the remote sectors. Along with the instructions for demodulation, the requesting modem includes a destination memory address within its local memory space for the LLRs from other sectors. The LLRs from other sectors are thus written directly into the original sector modem local memory space.

In an alternative embodiment, the LLRs and/or other information resulting from signal processing by a modem of all sector modems of the BTS can be stored in a centralized location or memory of the BTS, allowing any sector to pull the appropriate information upon request. In an embodiment using a centralized memory shared by all modems of the BTS, a sector modem requests demodulated LLRs for each of its associated SSs (users) from other remote sector modems. Along with the instructions for demodulation, the requesting modem includes in the request a destination memory address within the centralized memory for the LLRs from other sectors. The LLRs from other sectors are thus written directly into the original sector modem centralized memory address.

Figure 5:
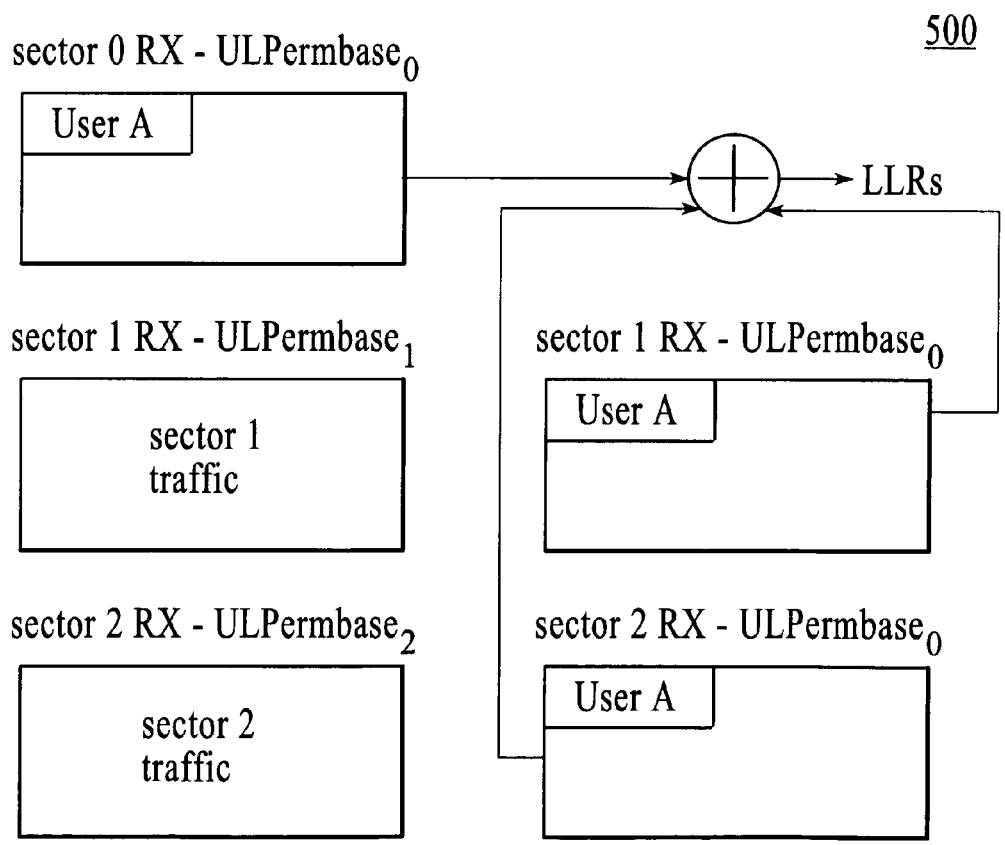
FIG. 5 is a block diagram of signal processing in a multi-sector BTS, under an embodiment.

FIG. 5 is a block diagram of signal processing 500 in a multi-sector BTS, under an embodiment. As described above, and with reference to FIG. 1, the multi-sector BTS processing 500 allows for a softer handoff or handover (SHO) for UL because it allows a BTS physical layer (PHY) to receive signals from SSs on all BTS antennas regardless of sector allocations of the antennas (e.g. twelve (12) BTS antennas in this example) and/or the SSs. Receipt by the PHY of information on multiple BTS antennas of an embodiment, regardless of sector allocation of the antennas, allows the BTS to close the link budget using the additional processing information resulting from processing the received signals in more than one sector (modem). The link budget is the accounting of all of the gains and losses from the transmitter, through the medium (free space, cable, waveguide, fiber, etc.) to the receiver in a telecommunication system; the link budget takes into account the attenuation of the transmitted signal due to propagation, as well as the loss, or gain, due to the antenna.

Referring to FIG. 1 and FIG. 5, the SS (User A) is allocated to sector 0, and signals from the SS are received by antennas in sector 0, sector 1, and sector 2, for example. Each sector modem receives and processes signals or traffic from SSs allocated to that sector via antennas allocated to that sector using a dedicated UL_Permbase (e.g., sector 0 modem receives signals from SSs allocated to sector 0 via sector 0 antennas using UL_Permbase$_0$ dedicated to sector 0; sector 1 modem receives signals from SSs allocated to sector 1 via sector 1 antennas using UL_Permbase$_1$ dedicated to sector 1; sector 2 modem receives signals from SSs allocated to sector 2 via sector 2 antennas using UL_Permbase$_2$ dedicated to sector 2). Additionally, each sector modem receives and processes signals or traffic from SSs allocated to that sector via antennas allocated to another sector (the sector antennas receiving the signal) using an independent UL_Permbase of the receiving sector modem (e.g., sector 1 modem receives signals from SSs allocated to sector 0 via sector 1 antennas using UL_Permbase$_1$ dedicated to sector 1). Each sector modem or receiver therefore uses the independent UL_Permbase to receive from adjacent sectors and uses information of all subchannel mappings and pseudorandom binary sequence (PRBS) information for relevant sector traffic. The LLR values or information and/or other processing information resulting from processing at each sector modem are then combined.

The signal processing 500 in the multi-sector BTS of this example therefore includes the following processing. Sector 0 antennas receive signals from the SS of User A (allocated to sector 0), and the sector 0 modem processes these received signals using UL_Permbase$_0$; the results of the processing (e.g. LLR information or data, etc.) are transferred to a shared memory or other component for combining with other processing results. Sector 1 antennas receive signals from the SS of User A, and the sector 1 modem processes these received signals using UL_Permbase$_0$ received from the sector 0 modem; the results of the processing (e.g. LLR information or data) are transferred to a shared memory or other component for combining with other processing results. Sector 2 antennas receive signals from the SS of User A, and the sector 2 modem processes these received signals using UL_Permbase$_0$ received from the sector 0 modem; the results of the processing (e.g. LLR information or data) are transferred to a shared memory or other component for combining with other processing results.

The soft LLR combining thus provides processing information relating to processing of signals received on all BTS antennas, while each sector modem only has to be coupled directly or connected to its own allocated antennas (a subset of all BTS antennas). In addition to the scalability and modularity provided under an embodiment, the multi-sector BTS with shared processing information described herein allows for graceful degradation in scenarios in which the LLR cannot be delivered in time. That is, if a remote sector modem cannot deliver its LLR information due to bus bandwidth and/or other limitations, the original sector still has available processing information (e.g. received LLRs) from its processing activities in addition to any relevant LLRs that were successfully delivered from other sectors for use in subsequent processing operations (e.g. FEC decoding).

The combining of multiple groups or sets of demodulated LLRs can be enhanced in an embodiment by configuring a sector (modem) to attempt decoding (e.g. FEC decoding) at any point in time with any set of LLRs regardless of sector origin. For example, an original sector can first attempt FEC decoding using only its own demodulated LLRs generated by the original sector modem. If the original sector does not have confidence metrics sufficient to support the decoded result, e.g., if there is a payload CRC that fails, the original sector can then combine LLRs from remote sectors with the LLRs of the original sector and re-execute FEC decoding. This combining of multiple sets of demodulated LLRs can reduce latency because the LLRs from remote sectors may arrive later than the LLRs from the original sector. Additionally, the LLR information from different sectors may not have to be soft-combined. While the combining of multiple sets of processing information has been described above with reference to demodulated LLRs the embodiment is not so limited as any signal processing information or results can be combined.

Figure 6:
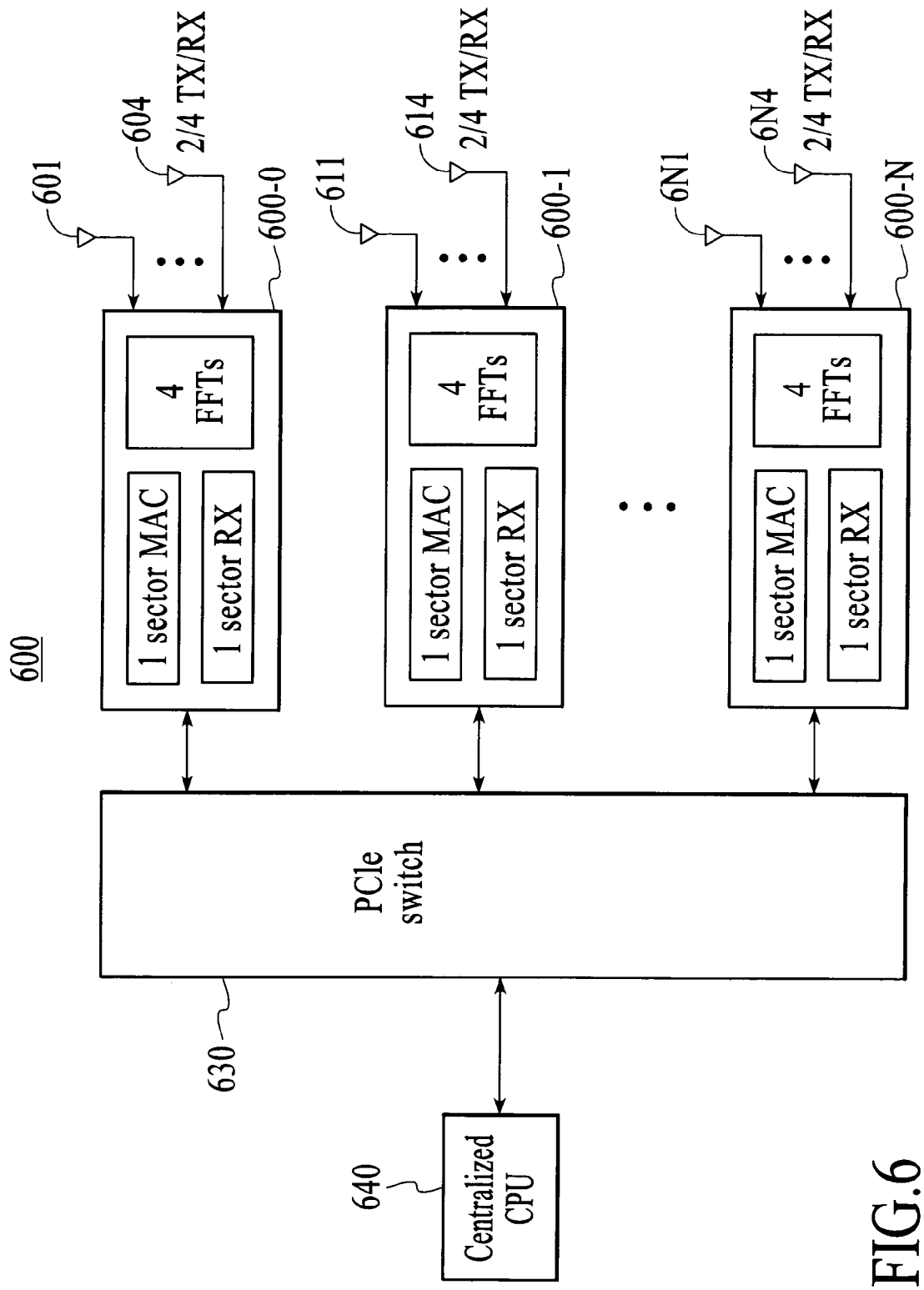
FIG. 6 is a block diagram of a multi-sector BTS, under an alternative embodiment.

FIG. 6 is a block diagram of a multi-sector BTS 600, under an alternative embodiment. The multi-sector BTS 600 of this example includes a number "N" of modems 600-0, 600-1, 600-N (where N is 1, 2, 3, . . . ), and each modem is coupled to four antennas (e.g., modem 600-0 is coupled to antennas 601-604, modem 600-1 is coupled to antennas 611-614, and modem 600-N is coupled to antennas 6N1-6N4); modems of other alternative embodiments can couple to any number and/or type of antennas. Each modem 600-0, 600-1, 600-N and the corresponding antennas to which the modem is coupled are allocated to each of the N sectors supported by the BTS 600. For example, the first modem 600-0 and corresponding antennas 601-604 are allocated to sector 0, the second modem 600-1 and corresponding antennas 611-614 are allocated to sector 1, and the $N^{th}$ modem 600-N and corresponding antennas 6N1-6N4 are allocated to sector N.

The multi-sector BTS 600 comprises a Peripheral Component Interconnect (PCI) switch 630 like, for example, a PCI Express (PCIe) switch 630. The PCIe switch 630 is coupled to the modems 600-0, 600-1, 600-N of the BTS 600. The PCIe switch 630 of an embodiment therefore couples or connects sector chipsets and PCIe ports on each BTS chipset enable inter-chip communication. The PCIe switch 630 uses PCI programming concepts, but bases the concepts on a completely different and much faster serial physical-layer communications protocol. The physical-layer comprises a network of serial interconnects (because synchronization of parallel connections is hindered by timing skew) much like twisted pair Ethernet.

The BTS 600 also includes a CPU 640 or other processor, and the CPU 640 is coupled to the PCIe switch 630. The BTS 600 can also include shared memory (not shown) that couples or connects the shared processing information of an embodiment to each sector modem. The shared memory can be a component or coupled to the CPU 640, coupled to the PCIe switch 630, and/or distributed among the CPU 640 and other components of the host BTS 600.

Figure 7:
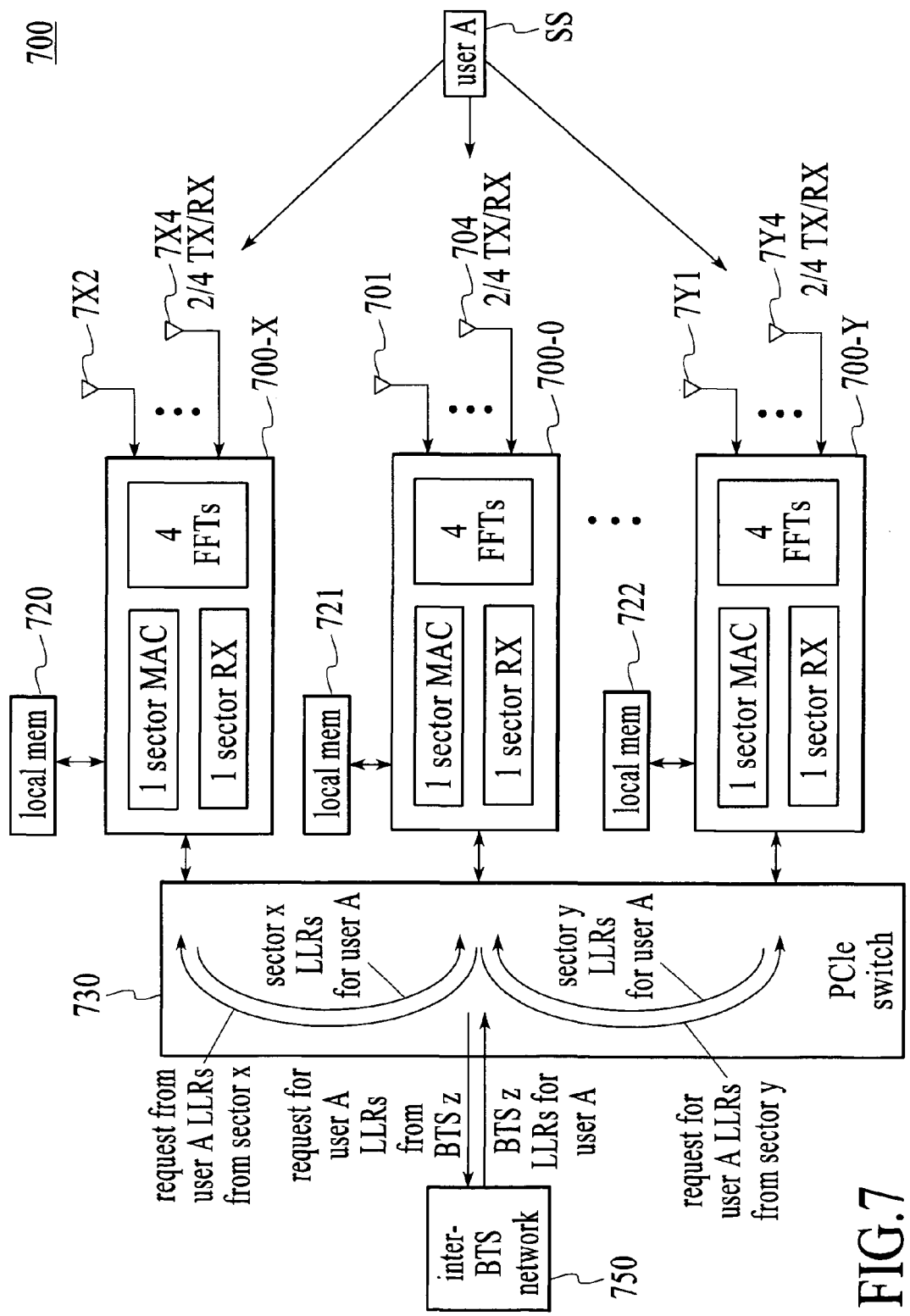
FIG. 7 is a block diagram of a multi-sector BTS, under another alternative embodiment.

FIG. 7 is a block diagram of a multi-sector BTS 700 with shared processing information, under another alternative embodiment. The multi-sector BTS 700 of this example includes N modems 700-0, 700-X, 700-Y, and each modem is coupled to four antennas; modems of other alternative embodiments can couple to any number and/or type of antennas. Each modem and the corresponding antennas to which the modem is coupled are allocated to each of the N sectors supported by the BTS 700. For example, the first modem 700-0 and corresponding antennas 701-704 are allocated to sector 0, the second modem 700-X and corresponding antennas 7X1-7X4 are allocated to sector X, and the $N^{th}$ modem 700-Y and corresponding antennas 7Y1-7Y4 are allocated to sector Y. The multi-sector BTS 700 comprises a PCIe switch 730 coupled to the modems 700-0, 700-X, 700-Y of the BTS 700. The BTS 700 includes an inter-BTS network 750 coupled to the PCIe switch 730, and the inter-BTS network couples BTS 700 to other BTSs (not shown) of a network of BTSs. Alternatively, the inter-BTS network 750 can couple directly to one or more of the modems 700-0, 700-X, 700-Y.

The BTS 700 also includes local memory 720-722 or local memory devices coupled or connected to each sector modem 700-0, 700-X, 700-Y. The local memory 720-722 can be co-located with the corresponding modem (e.g., local memory 720 co-located with modem 700-X, local memory 721 co-located with modem 700-0, and local memory 722 co-located with modem 700-Y) or can be located and/or distributed among other components of the host BTS 700. The local memory 720-722 can also be a component of or coupled to a CPU (not shown) of the BTS 700, coupled to the PCIe switch 730, and/or distributed among various other components of the host BTS 700. Furthermore, one or more local memories can be shared and/or distributed for use by one or more sectors modems of the BTS 700. The local memory 720-722, which includes one memory locations or spaces, is used by the corresponding sector modem or one or more sector modems of the BTS 700 to store processing information (e.g. LLR information or values, demodulation instructions, FEC decoding information, etc.) of the modems.

The BTS 700 also includes one or more processors or CPUs (not shown) along with shared memory (not shown) that couples or connects the shared processing information of an embodiment to each sector modem. The shared memory can be a component or coupled to a CPU, coupled to the PCIe switch 730, and/or distributed among a CPU and other components of the host BTS 700.

The BTS 700 of this embodiment is used to describe an example of sharing of processing information among various modems of a BTS. As described above with reference to FIG. 1 and FIG. 5, the multi-sector BTS processing allows for a SHO for UL because it allows a BTS PHY to receive signals from user SSs on all BTS antennas regardless of sector allocations of the antennas. Referring to BTS 700 of this example, the SS (User A) is allocated to sector 0, and signals from the SS (User A) are received by antennas in sector 0, sector X, and sector Y. Because the SS (User A) is allocated to sector 0, the modem 700-0 of sector 0 generates the processing information (e.g. LLRs) for the SS. The processing information (e.g. local LLRs for User A) generated by the modem 700-0 of sector 0 is stored in the local memory 721 corresponding to the modem 700-0 of sector 0.

When a remote modem and corresponding antenna(s) of the BTS 700, for example modem 700-X, receives signals from the SS (User A), the remote modem 700-X processes the received signals and generates processing information (e.g. LLRs) corresponding to the particular SS (User A). The processing information (e.g. local LLRs for User A) generated by the remote modem 700-X is stored in the local memory 720 corresponding to the remote modem 700-X. The original modem to which the SS is allocated (e.g. modem 700-0) requests, during processing operations, the processing information (e.g. LLRs) generated by the remote modem 700-X and corresponding to the SS. The request by the original modem 700-0 is made via a message or request sent over the PCIe switch 730. The remote modem 700-X responds to the request by providing the LLRs of the SS (User A) to the requesting original modem 700-0 via a message sent over the PCIe switch 730. Upon receipt the requesting original modem 700-0 uses the received LLRs for processing of the SS (User A) signals.

Similarly, when a remote modem and corresponding antenna(s) of the BTS 700, for example remote modem 700-Y, receives signals from the SS (User A), the remote modem 700-Y processes the received signals and generates processing information (e.g. LLRs) corresponding to the particular SS (User A). The processing information (e.g. local LLRs for User A) generated by the remote modem 700-Y is stored in the local memory 722 corresponding to the remote modem 700-Y. The original modem to which the SS is allocated (e.g. modem 700-0) requests, during processing operations, the processing information (e.g. LLRs) generated by the remote modem 700-Y and corresponding to the SS. The request by the original modem 700-0 is made via a message or request sent over the PCIe switch 730. The remote modem 700-Y responds to the request by providing the LLRs of the SS (User A) to the requesting original modem 700-0 via a message sent over the PCIe switch 730. Upon receipt the requesting original modem 700-0 uses the received LLRs for processing of the SS (User A) signals.

The BTS 700 of this embodiment is further used to describe an example of distributed BTS communication using the inter-BTS network. When a remote modem and corresponding antenna(s) of the BTS 700, for example modem 700-Z (not shown), receives signals from the SS (User A), the remote modem 700-Z processes the received signals and generates processing information (e.g. LLRs) corresponding to the particular SS (User A). The processing information (e.g. local LLRs for User A) generated by the remote modem 700-Z is stored in the local memory (not shown) corresponding to the remote modem 700-Z. The original modem to which the SS is allocated (e.g. modem 700-0) requests, during processing operations, the processing information (e.g. LLRs) generated by the remote modem 700-Z and corresponding to the SS. The request by the original modem 700-0 is made via a message or request sent over the inter-BTS network 750 and/or PCIe switch 730. The remote modem 700-Z responds to the request by providing the LLRs of the SS (User A) to the requesting original modem 700-0 via a message sent over the inter-BTS network 750 and/or PCIe switch 730. Upon receipt the requesting original modem 700-0 uses the received LLRs for processing of the SS (User A) signals.

Figure 8:
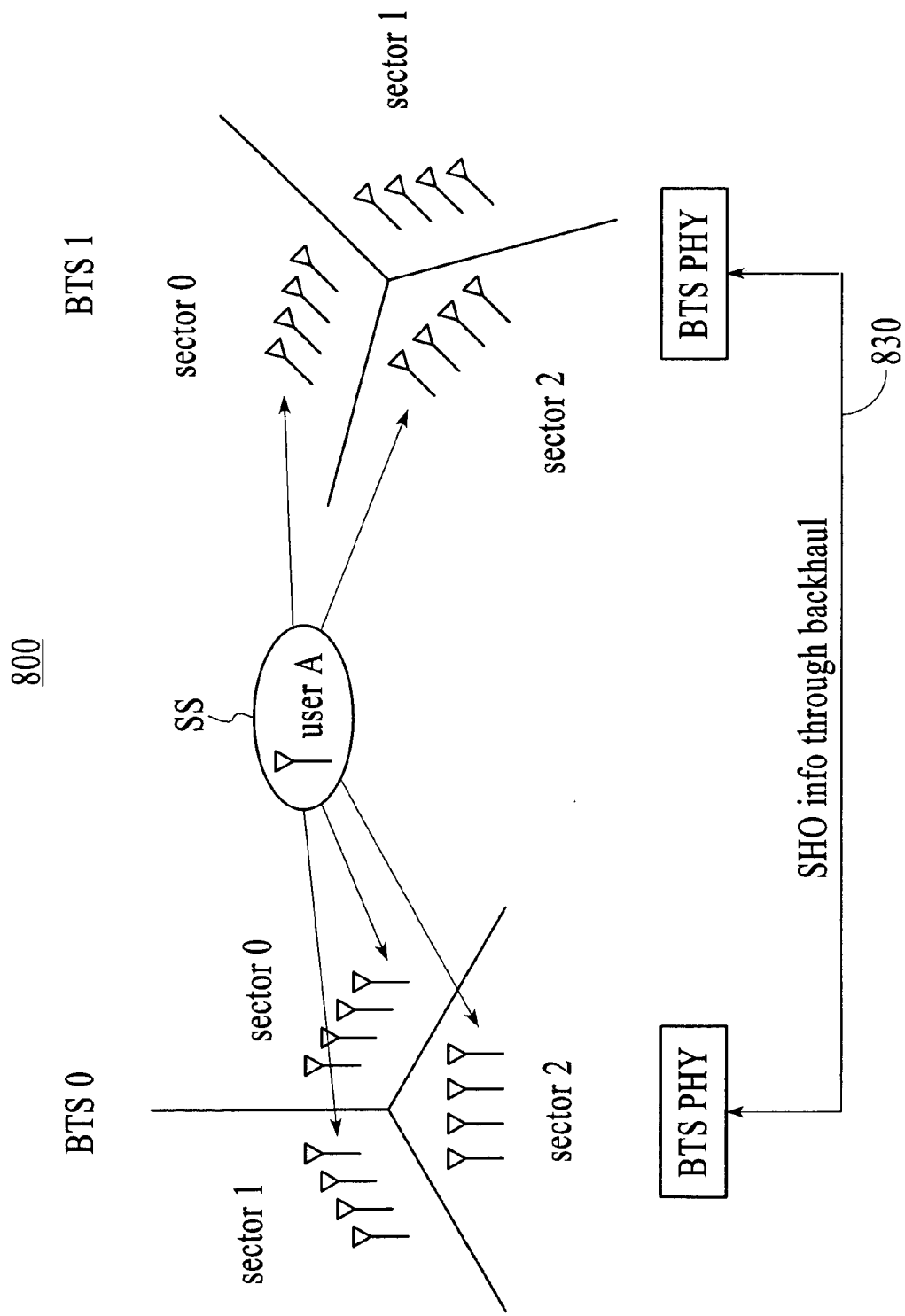
FIG. 8 is a block diagram of a network that includes numerous multi-sector BTS, under another alternative embodiment.

FIG. 8 is a block diagram of a network 800 that includes numerous multi-sector BTS BTS0, BTS1, under another alternative embodiment. Each BTS BTS0, BTS1 of this network 800 is similar to the multi-sector BTSs described above. The multi-sector BTS with shared processing information described herein can thus be applied to sectors belonging to different BTSs, which may be physically separated by large distances. Specifically, a modem of one sector (e.g. sector 1) of one BTS (e.g. BTS0) may request the processing information (e.g. demodulated LLR information) from a remote sector (e.g. sector 2) in a different BTS (e.g. BTS1), providing a local memory address at which to write the resulting processing information. In this case, the processing information is communicated through a network backhaul 830 that couples or connects the various BTSs of the network. The BTSs of an embodiment are coupled using the BTS PHY but are not so limited.

The multi-sector BTS with shared processing information of an embodiment includes a communication system comprising a plurality of antennas configured to form a plurality of antenna sets. Each antenna set of an embodiment is allocated to one of a plurality of sectors of a communication network. The system of an embodiment includes a plurality of modems. Each modem of an embodiment is coupled to an antenna set. The system of an embodiment includes a memory device coupled to the plurality of modems. The memory device of an embodiment includes signal processing information shared among the plurality of modems. The signal processing information of an embodiment allows each modem to receive communications from a plurality of subscriber stations in any sector via any of the plurality of receive antennas.

The memory of an embodiment is configured to allocate at least one of a plurality of memory locations to each of the plurality of modems. The allocated memory location of an embodiment receives and stores the signal processing information of the modem to which it is allocated. Each of the plurality of modems of an embodiment is configured to read information from the plurality of memory locations.

The signal processing information of an embodiment is information for one or more of demodulating and decoding communications with the plurality of subscriber stations.

The signal processing information of an embodiment includes one or more of log-likelihood ration (LLR) information and confidence information.

The system of an embodiment includes a bus coupled to the plurality of modems and the memory device.

The memory device of an embodiment comprises a plurality of local memory devices. Each of the plurality of local memory devices of an embodiment is coupled to each of the plurality of modems. The system of an embodiment includes a bus coupled to each of the plurality of modems.

The plurality of modems of an embodiment is on a computer chip.

The plurality of modems of an embodiment is distributed on a computer chipset.

The multi-sector BTS with shared processing information of an embodiment includes a communication method comprising receiving a signal in a plurality of sectors of a network. The signal of an embodiment is received from a subscriber station associated with a first sector of the plurality of sectors. The signal of an embodiment is received via an antenna and a receiver allocated to a sector in which the signal is received. The method of an embodiment includes generating processing information for the signal by processing the signal at a first receiver allocated to the first sector. The method of an embodiment includes sharing the processing information with other receivers of one or more others of the plurality of sectors other than the first sector. The method of an embodiment includes processing the signal in the other receivers of one or more others of the plurality of sectors other than the first sector using the processing information. The receiver of an embodiment is allocated to any of the plurality of sectors receives the signal using at least one antenna of any others of the plurality of sectors.

The processing information of the method of an embodiment is information for one or more of demodulating and decoding communications with the subscriber station.

The processing information of the method of an embodiment includes one or more of log-likelihood ration (LLR) information and confidence information.

The method of an embodiment includes storing the processing information in at least one memory device.

Each receiver of each of the plurality of sectors of the method of an embodiment reads information from the memory device.

The memory device of the method of an embodiment is a central memory device.

The method of an embodiment includes transferring processing information via a bus between each receiver of the plurality of sectors and at least one location of the memory device that corresponds to the respective receiver.

The method of an embodiment includes configuring the memory device to allocate at least one of a plurality of memory locations to each receiver of each of the plurality of sectors.

The memory device of the method of an embodiment comprises a plurality of local memory devices, wherein each of the plurality of local memory devices is coupled to each receiver of each of the plurality of sectors.

The method of an embodiment includes transferring processing information via a bus between each receiver of the plurality of sectors.

The multi-sector BTS with shared processing information of an embodiment includes a computer readable medium including executable instructions which when executed in a processing system allow a receiver allocated to a sector of a communication network to receive signals via all antennas of the network by receiving a signal in a plurality of sectors of a network. The signal of an embodiment is received from a subscriber station associated with a first sector of the plurality of sectors. The signal of an embodiment is received via an antenna and a receiver allocated to a sector in which the signal is received. Execution of the instructions of an embodiment generates processing information for the signal by processing the signal at a first receiver allocated to the first sector. Execution of the instructions of an embodiment shares the processing information with other receivers of one or more others of the plurality of sectors other than the first sector. Execution of the instructions of an embodiment processes the signal in the other receivers of one or more others of the plurality of sectors other than the first sector using the processing information. The receiver allocated to any of the plurality of sectors of an embodiment receives the signal using at least one antenna of any others of the plurality of sectors.

The processing information generated by the instructions of an embodiment is information for one or more of demodulating and decoding communications with the subscriber station.

The processing information generated by the instructions of an embodiment includes one or more of log-likelihood ration (LLR) information and confidence information.

Execution of the instructions of an embodiment stores the processing information in at least one memory device.

Execution of the instructions of an embodiment causes each receiver of each of the plurality of sectors to read information from the memory device.

The memory device of an embodiment is a central memory device.

Execution of the instructions of an embodiment transfers processing information via a bus between each receiver of the plurality of sectors and at least one location of the memory device that corresponds to the respective receiver.

The memory device of an embodiment is configured to allocate at least one of a plurality of memory locations to each receiver of each of the plurality of sectors.

The memory device of an embodiment comprises a plurality of local memory devices. Each of the plurality of local memory devices of an embodiment is coupled to each receiver of each of the plurality of sectors.

Execution of the instructions of an embodiment transfers processing information via a bus between each receiver of the plurality of sectors.

Aspects of the multi-sector BTS with shared processing information described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the multi-sector BTS with shared processing information include: microcontrollers with memory (such as electronically erasable programmable read only memory (EEPROM)), embedded microprocessors, firmware, software, etc. Furthermore, aspects of the multi-sector BTS with shared processing information may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and/or expressed (or represented) as data and/or instructions embodied in various computer-readable media, in terms of their behavioral, functional, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the multi-sector BTS with shared processing information is not intended to be exhaustive or to limit the systems and methods to the precise form disclosed. While specific embodiments of, and examples for, the multi-sector BTS with shared processing information are described herein for illustrative purposes, various equivalent modifications are possible within the scope of other systems and methods, as those skilled in the relevant art will recognize. The teachings of the multi-sector BTS with shared processing information provided herein can be applied to other processing systems and methods, not only for the systems and methods described above.

The elements and acts of the various embodiments described above can be combined to provide further embodiments. These and other changes can be made to the multi-sector BTS with shared processing information in light of the above detailed description.

In general, in the following claims, the terms used should not be construed to limit the multi-sector BTS with shared processing information to the specific embodiments disclosed in the specification and the claims, but should be construed to include all communication systems that operate under the claims. Accordingly, the multi-sector BTS with shared processing information is not limited by the disclosure, but instead the scope of the multi-sector BTS with shared processing information is to be determined entirely by the claims.

While certain aspects of the multi-sector BTS with shared processing information are presented below in certain claim forms, the inventors contemplate the various aspects of the multi-sector BTS with shared processing information in any number of claim forms. Accordingly, the inventors reserve the right to add additional claims after filing the application to pursue such additional claim forms for other aspects of the multi-sector BTS with shared processing information.

What is claimed is:

1. A communication system comprising:
a plurality of antennas configured to form a plurality of antenna sets, wherein each antenna set is allocated to one of a plurality of sectors of a communication network;
a plurality of modems, wherein each modem is coupled to one of the plurality of antenna sets;
the plurality of modems receiving Log-likelihood ratio (LLR) information; and
a memory device coupled to the plurality of modems, wherein the memory device includes log-likelihood ratio (LLR) information, the log-likelihood ratio (LLR) information allowing each modem to receive communications from a plurality of subscriber stations via any of the plurality of antennas sets.

2. The system of claim 1, wherein the memory device is configured to allocate at least one of a plurality of memory locations to each of the plurality of modems, wherein the allocated memory location receives and stores the log-likelihood ratio (LLR) information of the modem to which it is allocated.

3. The system of claim 2, wherein each of the plurality of modems is configured to read information from the plurality of memory locations.

4. The system of claim 1, wherein the log-likelihood ratio (LLR) information is information for one or more of demodulating and decoding communications with the plurality of subscriber stations.

5. The system of claim 1, further comprising a bus coupled to the plurality of modems and the memory device.

6. The system of claim 1, wherein the memory device comprises a plurality of local memory devices, wherein each of the plurality of local memory devices is coupled to one of the plurality of modems.

7. The system of claim 6, further comprising a bus coupled to each of the plurality of modems.

8. The system of claim 1, wherein the plurality of modems are on a computer chip.

9. The system of claim 1, wherein the plurality of modems are distributed on a computer chipset.

10. A communication method comprising:
receiving a signal at an antenna and receiver allocated to a first sector of a network and at an antenna and receiver allocated to a second sector of the network, wherein the signal is received from a subscriber station associated with the second sector of the network;
generating log-likelihood ratio (LLR) information for the signal by processing the signal at the receiver allocated to the first sector of the network;
sharing the log-likelihood ratio (LLR) information with the receiver allocated to the second sector of the network;
processing the signal in the receiver allocated to the second sector of the network using the log-likelihood ratio (LLR) information.

11. The method of claim 10, wherein the log-likelihood ratio (LLR) information is information for one or more of demodulating and decoding communications with the subscriber station.

12. The method of claim 10, further comprising storing the log-likelihood ratio (LLR) information in at least one memory device.

13. The method of claim 12, further comprising reading information from the memory device using the receiver allocated to the first sector of the network and using the receiver allocated to the second sector of the network.

14. The method of claim 12, wherein the memory device is a central memory device.

15. The method of claim 14, further comprising transferring log-likelihood ratio (LLR) information via a bus between the receiver allocated to the first sector of the network and the receiver allocated to the second sector of the network and at least one location of the memory device.

16. The method of claim 14, further comprising configuring the memory device to allocate at least one of a plurality of memory locations to the receiver allocated to the first sector of the network and the receiver allocated to the second sector of the network.

17. The method of claim 12, wherein the memory device comprises a first local memory device coupled to the receiver allocated to the first sector of the network and a second local memory device coupled to the receiver allocated to the second sector of the network.

18. The method of claim 17, further comprising transferring log-likelihood ratio (LLR) information via a bus between the receiver allocated to the first sector of the network and the receiver allocated to the second sector of the network.

19. A non-transitory computer readable medium including executable instructions which when executed in a processing system allow a receiver allocated to a sector of a communication network to receive signals via all antennas of the network by:

receiving a signal at an antenna and receiver allocated to a first sector of a network and at an antenna and receiver allocated to a second sector of the network, wherein the signal is received from a subscriber station associated with the second sector of the network;

generating log-likelihood ratio (LLR) information for the signal by processing the signal at a first receiver allocated to the first sector of the network;

sharing the log-likelihood ratio (LLR) information with the receiver allocated to the second sector of the network;

processing the signal in the receiver allocated to the second sector of the network using the log-likelihood ratio (LLR) information.

20. The computer readable medium of claim 19, wherein the log-likelihood ratio (LLR) information is information for one or more of demodulating and decoding communications with the subscriber station.

21. The computer readable medium of claim 19, further comprising storing the log-likelihood ratio (LLR) information in at least one memory device.

22. The computer readable medium of claim 21, further comprising reading information from the memory device using the receiver allocated to the first sector of the network and using the receiver allocated to the second sector of the network.

23. The computer readable medium of claim 21, wherein the memory device is a central memory device.

24. The computer readable medium of claim 23, further comprising transferring log-likelihood ratio (LLR) information via a bus between the receiver allocated to the first sector of the network and the receiver allocated to the second sector of the network and at least one location of the memory device.

25. The computer readable medium of claim 23, further comprising configuring the memory device to allocate at least one of a plurality of memory locations to the receiver allocated to the first sector of the network and the receiver allocated to the second sector of the network.

26. The computer readable medium of claim 21, wherein storing the log-likelihood ratio (LLR) information in the at least one memory device comprises storing the log-likelihood ratio (LLR) information in a first local memory device coupled to the receiver allocated to the first sector of the network and a second local memory device coupled to the receiver allocated to the second sector of the network.

27. The computer readable medium of claim 26, further comprising transferring the log-likelihood (LLR) information via a bus between the receiver allocated to the first sector of the network and the receiver allocated to the second sector of the network.

\* \* \* \* \*

UNITED STATES PATENT AND TRADEMARK OFFICE
CERTIFICATE OF CORRECTION

PATENT NO. : 8,090,412 B2
APPLICATION NO. : 11/488221
DATED : January 3, 2012
INVENTOR(S) : Garrett et al.

It is certified that error appears in the above-identified patent and that said Letters Patent is hereby corrected as shown below:

IN THE CLAIMS:

Column 13, claim 1, line 52, please replace "Log-likelihood" with --log-likelihood--;

Column 13, claim 1, line 58, please replace "antennas sets" with --antenna sets--; and Column 15, claim 19, line 7, please replace "at a first receiver" with --at the receiver--.

Signed and Sealed this
Eighth Day of May, 2012

David J. Kappos
*Director of the United States Patent and Trademark Office*